United States Patent [19]

Black

[11] 4,313,399

[45] Feb. 2, 1982

[54] TECHNIQUE FOR HANDLING VISCOUS LIQUIDS IN TRANSIT OR STORAGE

[76] Inventor: Robert B. Black, 2925 Denver St., Corpus Christi, Tex. 78404

[21] Appl. No.: 154,423

[22] Filed: May 29, 1980

Related U.S. Application Data

[60] Continuation-in-part of Ser. No. 46,240, Jun. 7, 1979, Pat. No. 4,271,789, and a continuation-in-part of Ser. No. 58,779, Jul. 19, 1979, which is a continuation-in-part of Ser. No. 794,044, May 5, 1977, abandoned, which is a division of Ser. No. 568,699, Apr. 16, 1975, abandoned, which is a division of Ser. No. 369,084, Jun. 11, 1973, abandoned, said Ser. No. 46,240, is a continuation-in-part of Ser. No. 813,667, Jul. 7, 1977, Pat. No. 4,197,831, which is a continuation of Ser. No. 620,327, Oct. 7, 1975, abandoned, which is a continuation-in-part of Ser. No. 462,094, Apr. 18, 1974, Pat. No. 4,025,291, which is a division of Ser. No. 192,262, Oct. 26, 1971, Pat. No. 3,844,270.

[51] Int. Cl.³ .............................................. F22B 1/00
[52] U.S. Cl. ................................ 122/4 R; 114/74 T; 122/379
[58] Field of Search ............. 122/4 R, 379; 114/74 R, 114/74 T; 137/565, 563

[56] References Cited

U.S. PATENT DOCUMENTS 2,699,155  1/1955  Olson et al. .................... 122/4 R X

*Primary Examiner*—Edward G. Favors
*Attorney, Agent, or Firm*—Kenneth P. Synnestvedt

[57] ABSTRACT

Method and apparatus are disclosed in a form particularly adapted for use in the handling of viscous liquids, such as viscous oil, on a barge. The technique includes provision of an engine for driving an oil pump, heat exchange mechanism through which the oil is pumped and arranged to effect heat transfer from the engine to the oil in order to maintain the oil at a temperature sufficiently high to facilitate pumping, for instance for the purpose of delivery of the oil at the destination of the barge.

39 Claims, 11 Drawing Figures

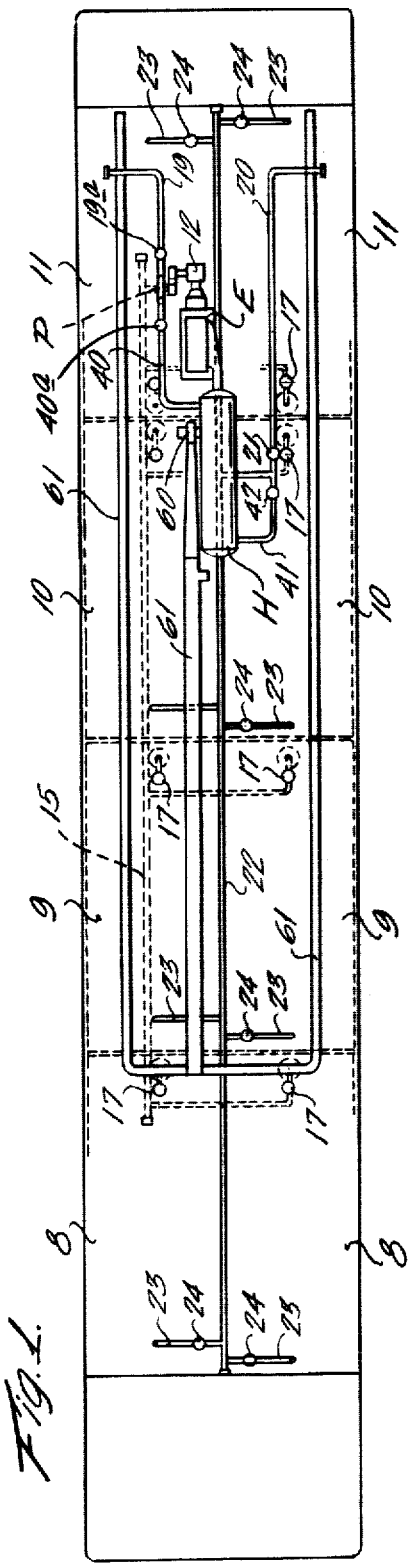
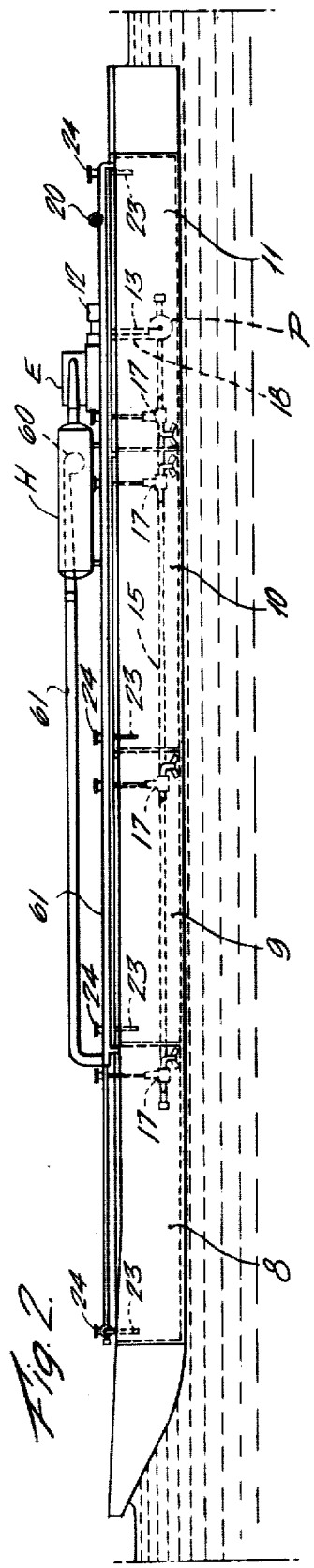
Fig. 1.
Fig. 2.

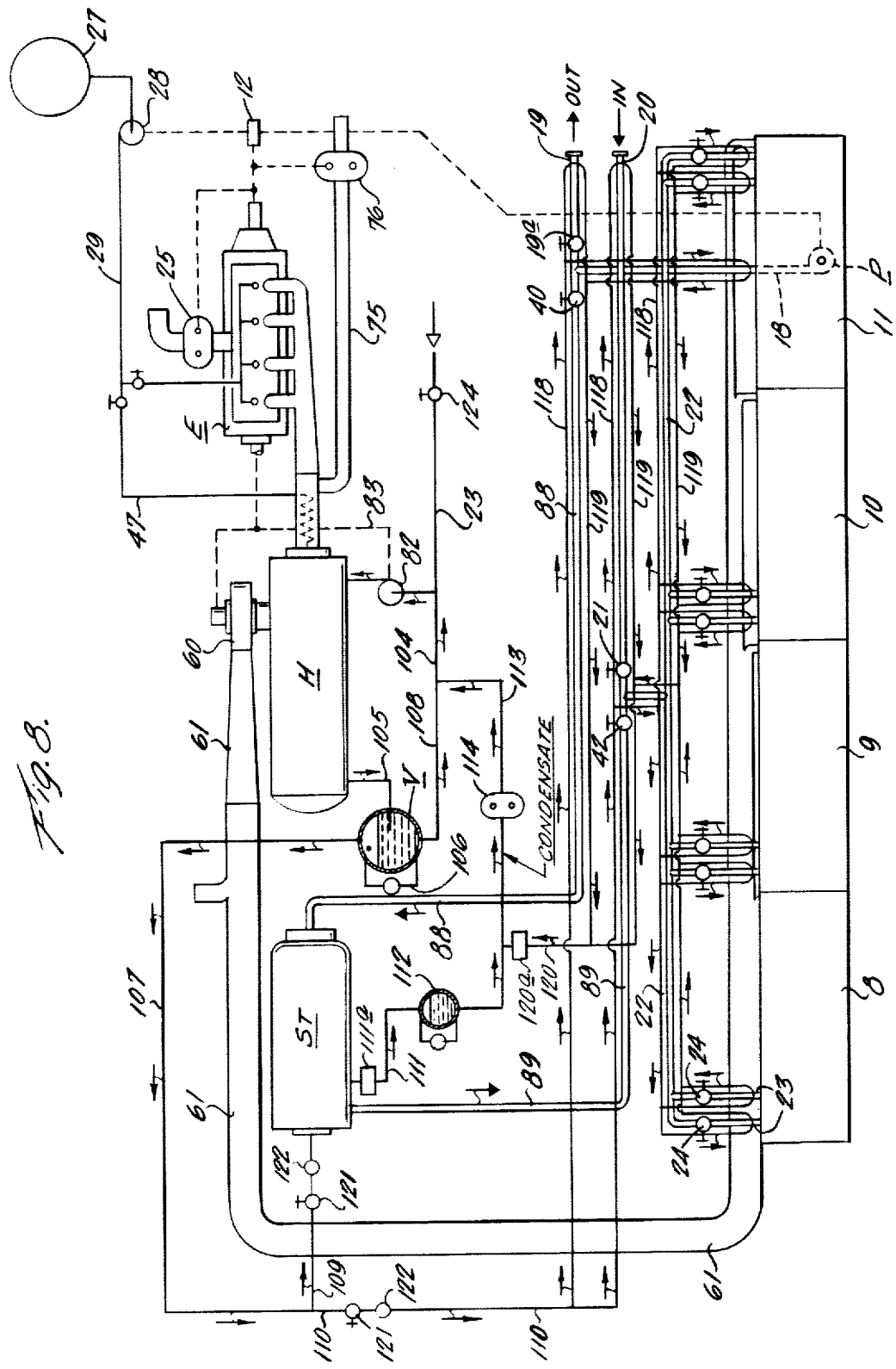

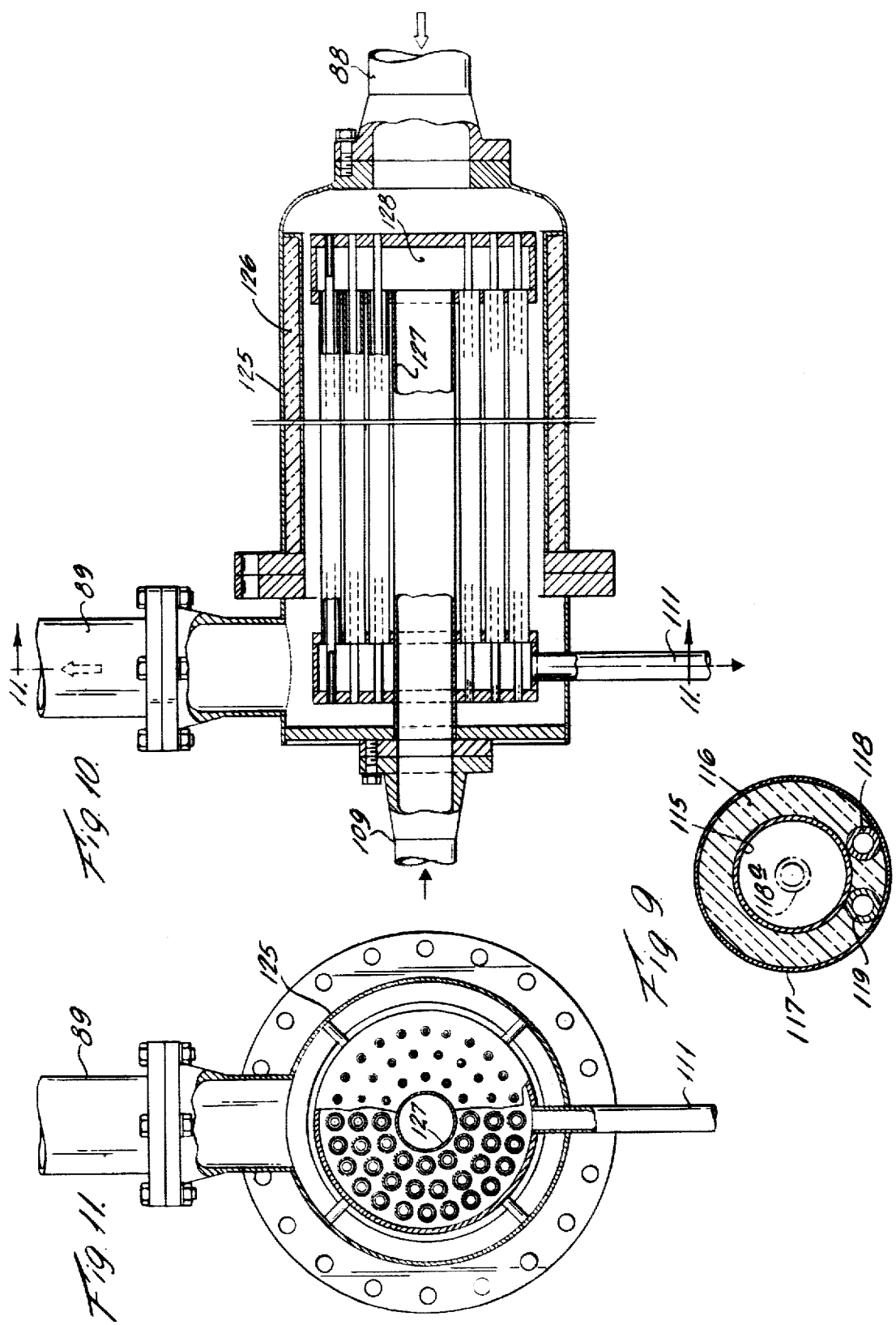

TECHNIQUE FOR HANDLING VISCOUS LIQUIDS IN TRANSIT OR STORAGE

CROSS REFERENCE

The present application is a Continuation-in-Part of my application Ser. No. 46,240, filed June 7, 1979, issued on June 9, 1981, as U.S. Pat. No. 4,271,789, which in turn is a Continuation-in-Part of application Ser. No. 813,667, filed July 7, 1977, now U.S. Pat. No. 4,197,831, which in its turn is a Continuation of application Ser. No. 620,327, filed Oct. 7, 1975, now abandoned, which in turn is a Continuation-in-Part of application Ser. No. 462,094, filed Apr. 18, 1974, and issued May 24, 1977, as U.S. Pat. No. 4,025,291, which in its turn is a Division of application Ser. No. 192,262, filed Oct. 26, 1971, and issued Oct. 29, 1974, as U.S. Pat. No. 3,844,270. The present application is also a Continuation-in-Part of my application Ser. No. 58,779, filed July 19, 1979, which is a Continuation-in-Part of Ser. No. 794,044, filed May 5, 1977, abandoned, which is a Division of Ser. No. 568,699, filed Apr. 16, 1975, now abandoned, which in its turn is a Division of application Ser. No. 369,084, filed June 11, 1973, now abandoned.

Certain aspects of the subject matter are also related to the subject matter of my application Ser. No. 61,755, which was filed Aug. 6, 1970, and which issued June 13, 1972, as U.S. Pat. No. 3,669,079.

BACKGROUND AND STATEMENT OF INVENTION AND OBJECTS

In the technique of the present invention, certain devices are employed of the types disclosed in various of my prior applications and patents above referred to. For example, various of the above applications and patents disclose heat exchangers embodying tube-in-tube units providing heat exchange passages within the inner tube and also in the annular space between the two tubes of each unit, one of the fluids involved in the heat exchange being passed through the inner tubes of each unit, and the other fluid being passed in the opposite direction through the annular space between the two tubes of each unit. In addition, various of the above applications and patents disclose a combustion chamber disposed within a heat exchanger and arranged to deliver the products of combustion to certain of the flow passages through the tube-in-tube units in order to provide for heat exchange to another fluid in other passages of the tube-in-tube units.

The prior applications and patents also disclose the arrangement of the heat exchanger to provide for cooling of combustion gases to a point below the dew point, in order to utilize the latent heat of evaporation of the moisture present in the combustion gases. Provision is also made in certain of the prior applications and patents for the use of elements lying within the heat transfer passages for the purpose of developing turbulence in the flow and thereby increasing the efficiency of heat exchange through the tube walls of the tube-in-tube units. Certain of the prior applications referred to also disclose heat exchange devices in which heat exchange elements subjected to acidic condensate are treated with special types of coatings, in order to resist the corrosive influence of such acidic condensate.

The present application is concerned with certain techniques and systems adapted for use in the handling of liquid cargo, especially viscous liquids, in transit or storage; and the present invention is particularly concerned with the use of certain of the features referred to in the preceding paragraphs in association with certain other features making up a system of exceptional efficiency, both from the standpoint of utilization of the energy available in fuels, and also from the standpoint of simplification of equipment while providing increased versatility with respect to the functions performed by the equipment. The technique of the present invention is particularly adapted to the handling of viscous liquids and especially in the barge handling of residual oils, such as #6 oil and also in the handling of other viscous materials, such as asphalt, molasses, etc.; and in view of this, the invention is herein described and illustrated in association with an oil barge, but it is to be understood that various features of the invention are also applicable to the handling of other cargo liquids on a vessel or other transport and/or storage facility. Certain features of the invention are effectively usable even with at least some nonviscous liquids, such as water and certain liquids used in solar energy systems.

In considering the invention as applied to a barge adapted for transport of oil, it is pointed out that in a typical #6 oil barge, an engine is commonly provided, usually a diesel engine, operating from a tank or source of diesel fuel, the engine serving to drive a pump which is utilized for the purpose of delivering the oil from the barge compartments or tanks at the destination of the barge. When the barge is loaded with oil, for instance #5 or #6 fuel oils, the oil is ordinarily pumped into the barge at a temperature in a range from about 125° to 150° F., at which temperature the oil is in a fluid state providing for efficient pumping. In the case of other viscous materials, certain other temperatures may desirably be observed in order to provide the desired fluidity for efficient pumping. For example, in the case of asphalt, the temperature would be of the order of 350° F.

If the temperature of the viscous oil or other liquid is permitted to drop substantially, the pumping becomes difficult, inefficient and even impossible. For example, in the case of a typical relatively high viscosity #6 oil, if the temperature drops below about 115° F., it becomes impractical to deliver the oil from the barge. In the handling of the oil, such drop in temperature has been encountered on many occasions merely as a result of encountering a cold front or because of travel of the barge from a loading area to a destination at which the atmospheric temperature is much lower than that at the starting point, for instance, from 20° to 60° F. lower. In many cases where this has occurred, it has become necessary for the barge to be removed from service, and even beached for a number of months, until seasonal weather change raises the average ambient temperature to a value which will again warm up the cargo to the point where it becomes possible to pump the oil from the compartments or tanks of the barge.

Certain attempts have been made to overcome some of the difficulties above referred to, including the construction of barges having extensive and expensive networks of piping within the tanks or compartments, in order to provide for the circulation of a heat transfer liquid through the pipes in the tanks and thus effect warming of the oil or other viscous liquid being transported. This prior type of system is subject to many disadvantages, including inefficiency in the use of the fuel used to operate the system, the cost of the equipment required, as well as the cost of installation, and also the fact that such prior technique is not economically adaptable to retrofitting of existing barges.

In connection with still another aspect of the present invention, it is first noted that in various oil-carrying barges, especially barges for residual type oils, the exposed connections or flow lines (commonly six or eight-inch i.d. piping) are enclosed in insulating jackets. In addition, it is also known to provide "tracers" associated with the exposed and insulated flow lines, the "tracers" comprising heat exchange tubes, for instance, a tube of about two-inches i.d., through which steam is passed, in order to effect heat transfer to the oil in the exposed flow lines, and thereby aid in preventing large increase in viscosity, such as would interfere with pumping of the oil. In a typical installation, such "tracers" are arranged in a loop, one end of the loop being used for input of the steam, and the other or return end of the loop being used for discharge; and the loop is ordinarily of sufficient length to provide for condensation of the steam at or close to the discharge end of the loop. In such a tracer system, a special source of steam was commonly provided and this, of course, increased original and installation costs of the barge.

One of the principal objects of the present invention is to overcome various problems and disadvantages such as those referred to above.

This general objective is accomplished according to the present invention by the employment of a technique including both equipment and method by which provision is made for maintaining the temperature of the residual oil (or other viscous liquid) in the compartments or tanks at a temperature providing the fluidity necessary for efficient pumping; and this is accomplished by employing one or more and preferably a multiple combination of unique features, including the following:

(a) Provision for transferring heat from the exhaust gases of the pump driving engine to the oil in the tanks; and preferably, this is achieved by employing the pump (ordinarily provided on the barge for delivery of the oil at the destination) in an alternative mode of operation effecting return circulation of the oil from the tanks through a heat exchanger in which the heat of the products of combustion of the engine is transferred to the oil.

(b) The delivery of the products of combustion from the engine into a secondary combustion chamber with further addition of fuel so that the oxygen present in the engine exhaust is used in a secondary combustion, the secondary combustion products being utilized for additional heat transfer to the oil being carried in the tanks of the barge.

(c) Utilization of the heat radiated from the cooling system of the engine to effect further heat transfer to the oil being carried in the tanks of the barge.

(d) Provision is also made according to the present invention for the use of the heat of the secondary combustion not only to effect indirect heat transfer to the cargo carried in the compartments or tanks, but also to supply steam for tracers of the kind above referred to.

Additional efficiencies are effected in the technique of the present invention in a number of other respects, which will be explained more fully hereinafter following description of a typical installation according to the present invention.

In accordance with still another aspect of the invention, provision is made for delivery of the products of combustion from the secondary combustion chamber of the heat exchanger (in which the unused oxygen remaining in the engine exhaust is used in combustion of additional fuel) into the upper regions of the cargo compartments on the barge. The secondary combustion products represent an inert gas mixture which can thus be utilized to displace the air in the upper portions of the compartments, thereby virtually eliminating the dangers of fire or explosion.

BRIEF DESCRIPTION OF DRAWINGS

How the foregoing and other objects and advantages are attained will appear more fully from the following description of the accompanying drawings, in which:

FIG. 1 is an outline plan view of a barge equipped with a system for handling oil or other viscous liquid in the manner of the present invention;

FIG. 2 is a similar elevational view of the barge of FIG. 1;

FIG. 8 is a view similar to FIG. 4 but illustrating still another alternative embodiment of the overall system and further illustrating the use of tracers associated with flow lines and supplied with steam from other equipment provided according to the invention;

FIG. 9 is a transverse sectional view of an insulated flow line incorporating tracers;

FIG. 10 is a longitudinal sectional view through an alternative form of heat exchange device of the tube-in-tube type, particularly adapted for use in a system of the kind schematically illustrated in FIG. 8; and FIG. 11 is a transverse sectional view on the line 11—11 of FIG. 10, illustrating various details of the heat exchanger of FIG. 10.

DETAILED DESCRIPTION (In the following detailed description, subheadings are introduced at various appropriate points, but it is to be understood that individual figures are frequently also referred to in sections under other subheadings.)

FIGS. 1 and 2

In a typical barge as shown in FIG. 1, a plurality of compartments or tanks, in this instance, eight such compartments being shown, are arranged in side-by-side pairs 8-8, 9-9, 10-10 and 11-11.

Toward the rearward end of the barge, a diesel engine E (for instance an engine commonly identified as G.M. 6-71 or 8-71) is arranged together with certain other equipment, such as the associated heat exchanger indicated in FIGS. 1 and 2 at H, and the oil pump P. The oil pump is desirably located in one of the rearmost compartments, it being common practice in unloading the oil at the destination to deliver the oil in sequence from the various compartments, beginning with those toward the front of the barge and ending with those at the rear of the barge. The sequential unloading results in tilt of the barge upwardly at the foreward end, and the rearward location of the pump is desirable for this reason.

FIG. 3 [I]

Figure 3:
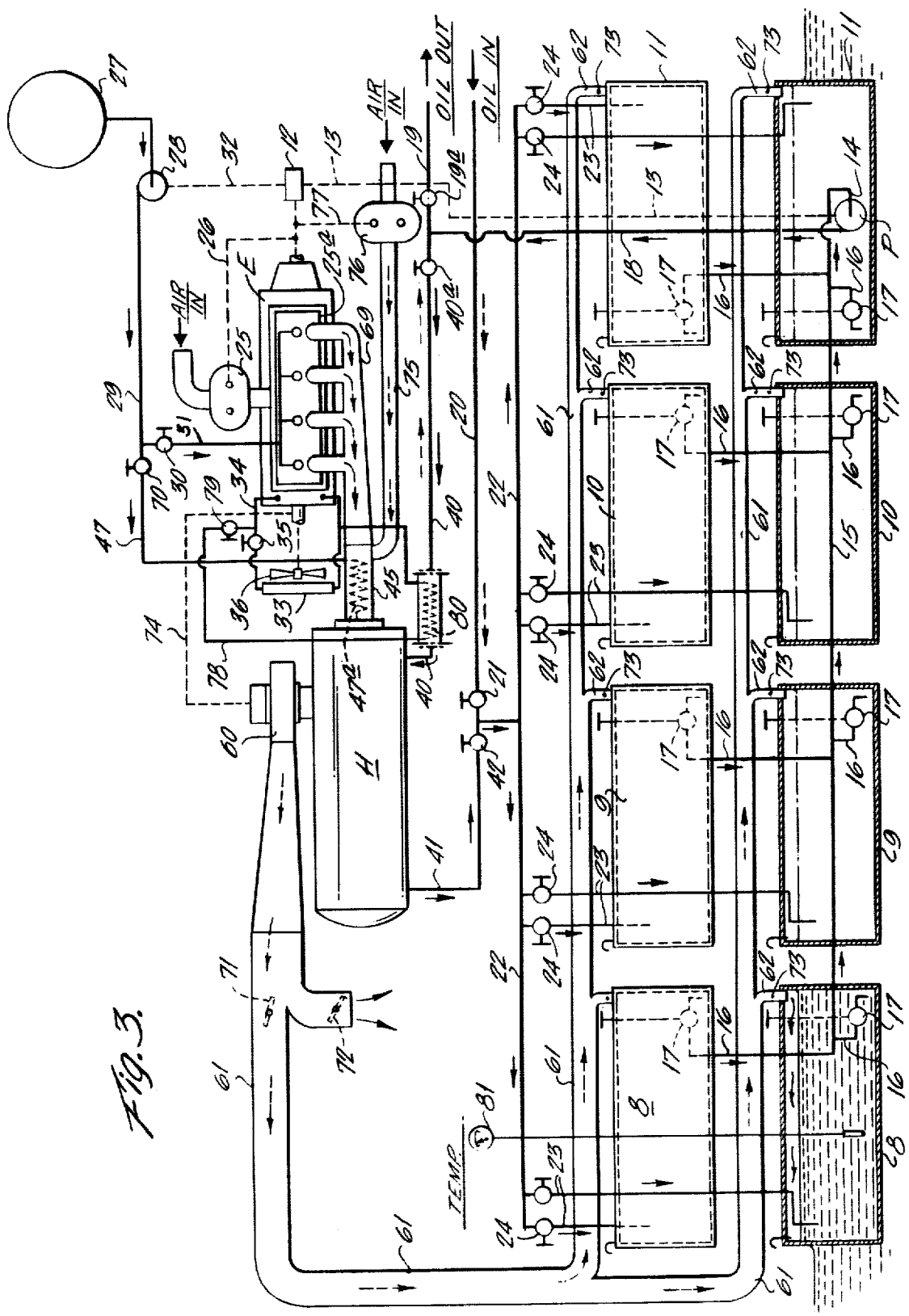
FIG. 3 is a schematic view showing eight tanks or compartments of a barge of the kind shown in FIGS. 1 and 2 and schematically illustrating one embodiment of Applicant's system, including the engine, pump, heat exchange equipment and other related components and their interconnections.

As seen in the embodiment of FIG. 3, the pump P is driven from the shaft of the diesel engine E through a transmission 12 and the power connection indicated by the dotted line 13. The inlet 14 of the pump is connected with the principal inlet or suction line 15 of the piping system on the barge, this suction line being connectable with the interior of any one of the tanks by means of branch lines 16 and individually controllable valves 17, the valves being arranged to be operated from a position above the deck of the barge. The outlet 18 from the pump is connected with the delivery line 19 serving for discharge or delivery of the oil or other viscous liquid at the barge destination, this delivery line being controlled by the valve 19a.

In addition to the above cargo delivery system, a typical barge installation also includes an intake system including a connection such as shown at 20 for receiving the oil or other viscous liquid to be transported by the barge. This connection communicates through the valve 21 with the distribution line 22 extended throughout the length of the barge and having branch supply lines 23 extended to the individual tanks and each having a separately controllable valve 24.

The foregoing basic inlet and outlet piping, pump and engine have commonly been provided on barges and the system and equipment of the present invention is adapted to be associated with these existing components, thereby facilitating retrofitting of existing barges in order to adapt them to operation in accordance with the technique of the present invention. In a typical installation, the principal oil supply, distribution and delivery pipes are customarily at least several inches in diameter, quite commonly being formed of eight-inch diameter (i.d.) piping. The engine, particularly if it is of the general type above referred to, is also customarily provided with an air supply system including a blower (for instance a blower known as a Roots blower) and indicated at 25, in order to supply the required air for combustion in the engine. The blower is driven from the engine as indicated in dotted lines at 26.

As is well-known, in diesel engines, for example, of the kinds referred to above, provision is made for delivery of the air from the supply blower into a chamber, as diagrammatically indicated at 25a, surrounding the cylinders, and from which chamber the air is admitted into the cylinders through ports which are uncovered when the pistons are in bottom dead center position. All of the air supplied by the blower 25 is delivered through the cylinders, and more or less of the air is used in combustion of the fuel, depending upon the amount of fuel introduced. Normally, only a fraction of the air is utilized in the engine for the combustion effective to develop the desired power, and the excess of the air is delivered from the engine with the exhaust gases.

An on-board supply of diesel fuel indicated at 27 is provided and a fuel pump 28 delivers fuel from the supply through the connection 29 and the valve 30 to the fuel inlet line 31. The pump 28 may be driven by the engine through the transmission 12 as indicated by the dotted line 32. In a customary engine installation, the engine is also provided with a cooling jacket in which a heat transfer liquid is circulated, the cooling liquid being passed through the radiator 33 and a closed circuit provided by the connections 34, when the valve 35 is open. A fan 36 associated with a radiator 33 may also be driven from the engine as is indicated. Because of provision of other means for making use _ the heat of the liquid circulating through the engine cooling jacket (such other means being described hereinafter), it is contemplated that the radiator 33 be cut off by valve 35 when said other means are in operation.

Before considering certain other phases of the system as diagrammed in FIG. 3, attention is now directed to the heat exchange unit H illustrated in FIGS. 6 and 7; and thereafter, reference will be made again to FIG. 3 in order to explain the interrelationship between the heat exchanger of FIGS. 6 and 7 and the system provided in accordance with the present invention.

The heat exchanger comprises a cylindrical shell 37 having end closure members 38 and 39 at opposite ends. The shell has an oil inlet connection 40 and an oil outlet connection 41; and as shown in FIG. 3, the inlet connection 40 is associated with the outlet 18 from the pump P through the valve 40a. As seen in FIG. 3, the oil outlet connection 41 from the shell is associated with the distribution line 22 through the valve 42. These arrangements provide for circulation of the oil in any compartment of the barge to and through the heat exchanger, preferably a unit of the kind shown in FIGS. 6 and 7.

The end regions within the shell serve as headers with which the oil inlet and outlet connections 40 and 41 are associated.

Figure 6:
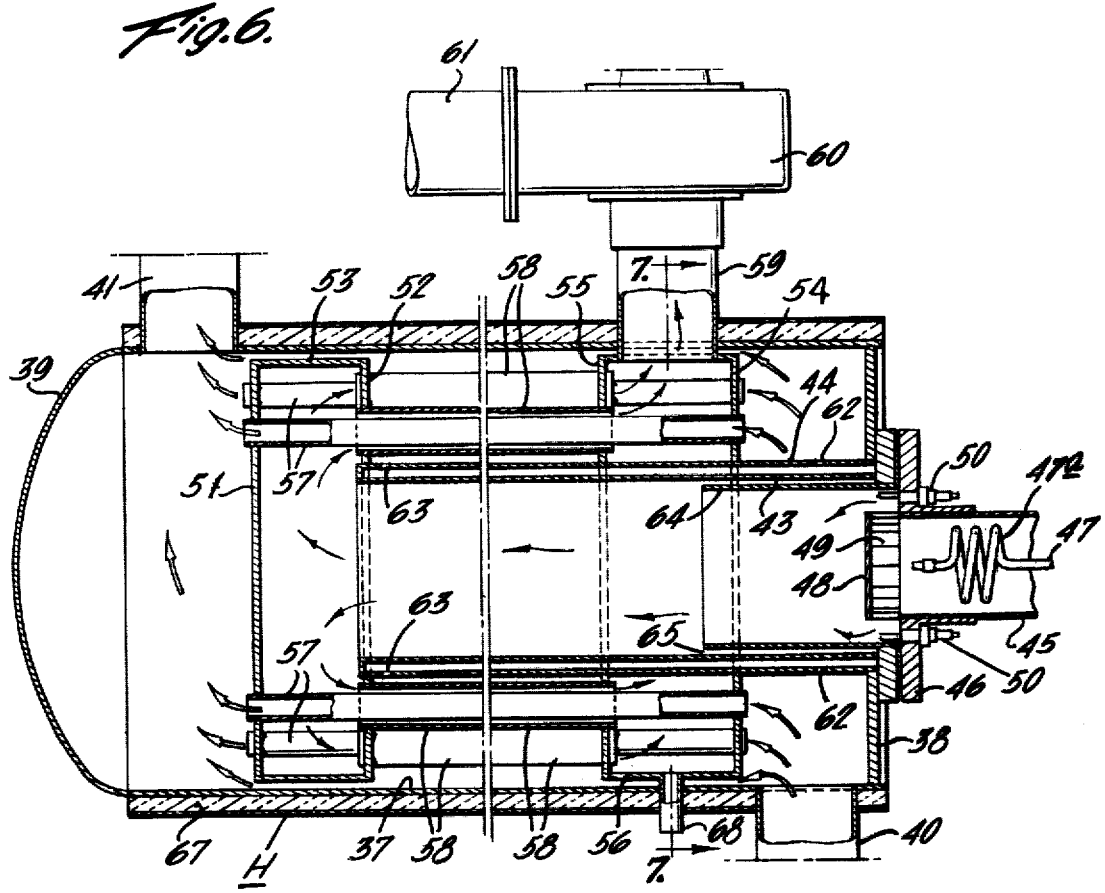
FIG. 6 is a longitudinal sectional view through a heat exchange device of the tube-in-tube type, combined with a secondary combustion chamber as contemplated by the present invention, this view representing one form of heat exchange equipment particularly suited for use in systems according to the present invention.
Figure 7:
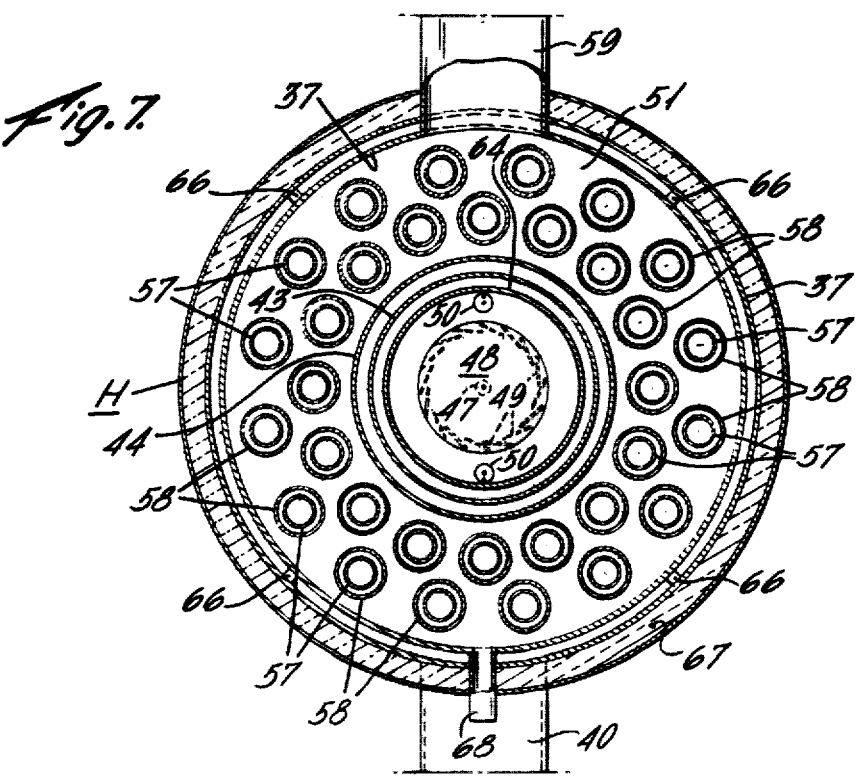
FIG. 7 is a transverse sectional view on the line 7—7 of FIG. 6, illustrating various details of the heat exchanger of FIG. 6.

FIGS. 6 and 7

In the embodiment of FIGS. 6 and 7, a central combustion chamber is provided, being defined by spaced inside and outside cylindrical walls 43 and 44. Toward the right as viewed in FIG. 6, a supply connection 45 is provided, through which products of combustion, including the excess air, are delivered from the engine, as will be explained. This supply connection is mounted on a plate 46 serving as a closure for the right hand end of the central cylindrical combustion chamber. A fuel supply connection 47 extends into the supply conduit 45, a jet of the fuel being discharged against the splash plate 48. This plate is mounted at the inner ends of a series of spaced and inclined baffle elements 49 which tend to impart a swirling motion to the incoming air and fuel as they enter the combustion chamber. One or more spark ignition devices such as indicated at 50 may be employed for igniting the air and fuel in the combustion chamber. The left hand end of the combustion chamber communicates with a header space provided between the tube sheets 51 and 52, this header space being circumferentially enclosed by an annular wall 53. Toward the opposite end of the exchanger, another pair of tube sheets 54 and 55 are provided, in order to define another header space, and this space is enclosed by an annular wall 56.

The tube sheets 51 and 54 serve to mount opposite ends of the inside tube elements 57 of an annular bundle of tube-in-tube units, these tubes 57 communicating with the inlet and outlet header spaces formed in the opposite ends of the shell 37 of the exchanger. Tube sheets 52 and 55 serve to mount opposite ends of the outside tube elements 58 of the tube-in-tube units, these tubes 58 communicating with the inlet and outlet header spaces for the combustion gas provided between the pairs of the spaced tube sheets 51-52 and 54-55. The tube-in-tube units are arranged in an annular bundle or array extended within the annular space lying inside of the shell 37 and outside of the outer wall 44 of the combustion chamber.

The gas discharge connection 59 is connected with the outlet header for the products of combustion, the products of combustion being discharged through the offtake or stack 61. The flow of the air and products of combustion from the engine is usually sufficient to deliver the gases from, into and through the offtake 61 and into the top of the compartments. Although not necessary, if desired, increased capacity may be provided by a blower indicated at 60.

Although various arrangements for the combustion chamber may be employed, it is preferred to employ a double-walled chamber, the outer wall 44 having a series of apertures 62 at the right hand end as viewed in FIG. 6, and a series of apertures 63 in the left hand end as viewed in FIG. 6. These series of apertures provide for circulation of liquid from the shell space toward the right hand end of the shell, through the annular jacket surrounding the combustion chamber and back into the shell space toward the left hand end of the shell.

A heat shield is provided just inside of the inside wall of the combustion chamber to provide a "dead air" space inside of the inner wall of the combustion chamber. This heat shield is indicated at 64 and is provided for reasons as brought out in my prior U.S. Pat. No. 3,669,079, issued June 13, 1972. The "dead air" space at the outer side of the heat shield desirably communicates with the combustion chamber, as is indicated at 65, thereby providing intercommunication or pressure equalization between the "dead air" space and the combustion chamber.

Since the oil has a positive coefficient of thermal expansion, the ports 62 and 63 are preferably proportioned to provide greater cross-sectional flow area for the ports 62 (which serve as inlet ports) than for the ports 63 (which serve as outlet ports). For example, the cross-sectional flow area of the inlet ports 62 should be about 10% greater than the cross-sectional flow area of the ports 63.

Moreover, the cross-sectional flow area of the inlet and outlet ports 62 and 63 for the jacket space surrounding the combustion chamber, is preferably proportioned in relation to the cross-sectional flow area of the inner tubes of each tube-in-tube unit to provide for higher rate of flow through said jacket space as compared with the rate of flow through each of said inner tubes. Since the rate of heat exchange will be greater in the jacket space than in the inner tubes, this will diminish the temperature differential as between the liquid delivered into the outlet end of the shell from the jacket space and from the inner tubes.

The inside headers formed by the pairs of tube sheets 51-52 and 54-55, and also the annular tube bundle are positioned in spaced relation to the tubular shell wall 37 by means of spacers such as shown at 66 in FIG. 7. This provides a space for flow of the liquid being heated not only through the central tube of each tube-in-tube unit, but also in an annular space surrounding the tube bundle and extended between the tubes, so that the liquid being heated may contact the outside surfaces of all of the outer tubes 58 of the tube-in-tube units. In view of this arrangement, any tendency for heat to flow or radiate away from the inside headers or elements of the tube bundle results in transfer of such heat to the liquid intended to be heated by the exchanger; and this provides a substantial increase in thermal efficiency. In effect, the interior parts of the heat exchanger are "immersed" in the liquid to be heated, so that all of the heat radiated or transferred from the combustion chamber and the flue tubes necessarily is transferred to the liquid being heated. A fibrous insulation type of layer or covering 67, such as glass or rock or other mineral wool, may also be applied outside of the tubular shell 37 of the heat exchanger to minimize heat loss.

The spacers 66 around the wall 53 serve to center the tube bundle and combustion chamber within the shell but are preferably arranged to permit axial movement of the enclosed header with respect to the header at the other end, which is anchored in position by the discharge duct 59.

The provision of a double-walled combustion chamber (43 and 44), with inlet and outlet openings (62 and 63) toward opposite ends communicating with the interior space within the shell, provides further heat exchange surface for transfer of heat from the combustion chamber and combustion products to the liquid being heated.

Since (as is fully developed hereinafter) it is contemplated for the present purposes that the gas or products of combustion delivered from the exchanger should be reduced in temperature below the dew point, provision is made for the discharge of condensate from the lower portion of the outlet header formed between the tube plates 54 and 55. For this purpose, a condensate drain 68 is provided; and in addition, in order to ensure drainage, it is contemplated that the heat exchanger should be mounted so that the right hand end, as viewed in FIG. 6, is somewhat lower than the left hand end in order to provide for gravity flow of the condensate forming in the flue tubes toward the right, for ultimate discharge from the drain 68. If desired, the exchanger, as shown in FIGS. 6 and 7, may be arranged vertically, in which event, the right hand end of the unit as it appears in FIG. 6 would be presented downwardly; and in this case, the condensate drain 68 may be positioned somewhat differently in order to effect drainage from the lowest region of the gas outlet header.

Because of the foregoing, it is preferred to fabricate various parts of acid-resistant metals or, alternatively, surfaces of the metal in the flue gas discharge end of the heat exchanger are preferably treated after fabrication with protective coating material to resist corrosion by the acids formed as by-products of combustion. For example, special metal alloys or treatments of the kind referred to in my prior application Ser. No. 58,779 above identified, may be used.

In connection with the operation of the engine E and heat exchanger H, it is noted that it is preferred that the exhaust products be lowered in temperature from the engine discharge temperature (about 1000° to 1200° F.) down to a temperature preferably below the dew point of the exhaust products, which will vary somewhat depending upon the amount of sulphur compounds present. In the absence of sulphur compounds, the dew point may approximate 140° to 160° F.; but with substantial quantities of sulphur compounds, the dew point may rise to as high as 200° to 250° F. The reduction in temperature in the heat exchanger is preferably at least sufficient to bring the temperature below about 200° F., and particularly high efficiency is attained if the temperature of the exhaust products is brought down to less than 100° F. This can be achieved if the temperature of the liquid being heated is below the temperature of the gaseous products discharged from the heat exchanger. The temperature conditions will, of course, vary; but where practical, it is preferred to bring down the temperature of the secondary combustion products to a value below the dew point in order to make use of the appreciable amount of heat represented by the latent heat of condensation.

In the embodiment of FIGS. 6 and 7, heat transfer elements may be positioned within the annular space between the pairs of tubes, as in various other tube-in-tube heat exchange devices disclosed in various of the companion applications above fully identified.

FIG. 3 [II]

Attention is now directed again to the schematic illustration of FIG. 3, from which it will be seen that the air supply conduit 45 is connected with the exhaust manifold 69 of the engine E, so that the exhaust products from the diesel engine are delivered directly into the combustion chamber in the heat exchanger H. The fuel supply pipe 47 is connected through the valve 70 with the fuel supply line 29 receiving fuel from the supply tank 27. The fuel supply pipe 47 desirably has a helical coil 47a positioned in the intake duct 45 and serving to preheat the fuel prior to introduction into the combustion chamber in the heat exchanger H.

The arrangement just referred to provides for a secondary combustion within the heat exchanger, making use of the excess oxygen remaining in the combustion products delivered from the diesel engine and combining such oxygen with additional fuel; and it is to be noted that this is accomplished in a manner which effectively utilizes the heat already present in the products of combustion delivered from the engine, thereby increasing the capacity of the heat exchanger itself in the warming of the oil passed through the heat exchanger.

The exhaust products from the secondary combustion within the heat exchanger, as delivered from the outlet 59, comprise a substantially inert gas which is delivered through the ducting 61 having branches 62 for delivery of the gases into the upper regions of the various oil compartments of the barge, thereby providing for displacement of air from those compartments, with resultant elimination of fire and explosion hazard. For certain types of viscous liquids, this distribution of the exhaust products to the compartments need not necessarily be used, and the equipment contemplates employment of butterfly dampers such as shown at 71 and 72 which may be used to alternatively direct the gases to the tanks or discharge the gases to atmosphere, as will appear clearly from FIG. 3. Individual dampers at points indicated at 73 may be provided in the branch ducts extended to the individual compartments.

Although the embodiments illustrated in the drawings of the application incorporate a blower 60 associated with the gas offtake 59 of the heat exchanger and delivering the gases into the ducting 61, it is to be understood that such blower need not necessarily be employed. Such a blower would, of course, increase the gas-handling capacity and also the effective heating capacity of the heat exchanger. Where a blower such as indicated at 60 is used, it may be driven in any desired way, for instance, by some form of transmission driven by the engine as indicated by the dotted line 74.

If desired, additional air may be introduced into the engine exhaust products in advance of delivery thereof into the secondary combustion chamber, provision for this purpose including the air duct 75 and a blower, such as a Roots blower 76 having a driving connection with the engine indicated by the dotted line 77.

Still another fuel and energy conservation feature is disclosed in FIG. 3. According to this feature, the cooling liquid for the engine may be circulated through some connections bypassing the radiator 33, these connections being indicated at 78 and having a control valve 79, which connections provide for circulation of the cooling liquid through the helical coil 80 which is arranged within the oil circulation duct 40. In FIG. 3, a short section of that duct is shown by double lines, instead of merely by a single line as in other portions of the schematic diagram. In this connection, it should be kept in mind that this main circulation ducting will comprise relatively large diameter piping and the helical coil 80 may be inserted directly in such piping or, alternatively, a small chamber may be included in the piping in order to accommodate the coil 80. By this feature, even the heat and, therefore, the energy which is normally lost by radiation of heat from the engine cooling radiator directly into the ambient air is recovered in accordance with the present invention.

A temperature gauge such as indicated at 81 may be provided for the liquid in each of the tanks, in order that the cooling action may be instituted at any time desired in the operation of the barge.

Several important aspects of energy conservation provided by the system of the present invention should be particularly noted. First, because of the use of a heat exchanger of the tube-in-tube type arranged in the manner disclosed in FIGS. 6 and 7, and because of the manner of connection of this unit into the system as shown in FIG. 3, the oil being circulated from the tanks enters the shell space of the heat exchanger and passes not only through the inside tubes of each tube-in-tube unit, but also passes through the annular jacket surrounding the secondary combustion chamber within the heat exchanger. Still further, this oil passes over the outside surfaces of the outer tubes of the tube-in-tube units, and even passes around the outer peripheral walls 53 and 56 of the headers for the flow of combustion gases from the secondary combustion chamber through the outer tubes of the tube-in-tube units. In consequence, it will be seen that the combustion chamber lies totally within and is completely surrounded by the fluid being heated so that all of the BTU's liberated in the combustion process must be transferred to the oil being heated. Since the hot combustion products pass through the annular flow channels between the tubes of each tube-in-tube unit and because of the arrangement of the shell and tube bundle as above fully described, the tube bundle is completely immersed in the liquid to be heated and the total size of the heat exchanger and the amount of materials required for its fabrication is thereby substantially reduced.

The employment of the dual phase combustion system, with the oil brought into efficient heat exchange relation to the secondary products of combustion, enables the use of existing equipment on barges and eliminates the necessity for many components such as pumps, auxiliaries, power plant for a thermal fluid heating system, as well as the expensive thermal heating fluid itself and its circulation system, as is required in certain proposed systems involving the installation or initial construction of heating coils within the tanks. It is particularly to be noted that the system of the present invention actually makes use of the cargo itself as the thermal fluid for delivering and distributing heat to the liquid cargo.

An installation of the kind herein disclosed is readily adapted to retrofitting existing barges and can be effected with much less time and much less costly installation procedures.

The operation of the equipment according to the invention is also relatively simple as compared with certain other proposed systems; and the system of the present invention can readily be employed either by retrofitting or by initial construction with much lower capitol investment than is possible with other systems.

In connection with the efficiencies of Applicant's system, several additional points are to be taken into account, as follows:

Because of employing dual phase combustion, Applicant's system makes more efficient use of the energy which is expended in driving the blower 25 by the engine. Having in mind that the air output of the blower 25 remains constant (for a given engine speed), and the fact that all of this air is delivered through the air supply chamber 25a, into and through the cylinders, and thence is discharged through the exhaust system, a substantial economy is effected because of the "recovery" of this air and the use thereof in the secondary combustion chamber.

Still further, an appreciable amount of heat is imparted to the circulating oil or other liquid by virtue of the pumping action of the oil pump P in circulating the oil through the heat exchanger. In a typical installation, this pump may absorb as much as 80 horsepower and most of this energy is recovered in the form of heat transferred to the stream of oil flowing through the pump. In operation, when it is deemed that the oil or other liquid should be heated or warmed, the engine is started, thereby driving the pump in the usual manner; but instead of delivering the oil from the tanks, the oil is circulated through the heat exchanger and returned to the tanks, and this circulation is preferably continued (in the case of oils, such as #6 oil) sufficiently to raise the temperature to a range of about 135°-150° F. The pump inlet connections are all arranged toward the bottom of the compartments, and the return connections deliver the oil into the top of the compartments; and in consequence, the oil is withdrawn from the bottom of the tanks where the temperature is the lowest, with resultant circulation of the oil out of the bottom and back into the top of the tanks. This is preferably effected on a tank-by-tank basis.

The eight-inch or other suction and distribution lines are also desirably insulated at least to some extent, as is explained more fully hereinafter with particular reference to FIG. 5.

The capability of the dual phase combustion process for producing a substantially inert gas, consisting essentially of nitrogen and $CO_2$, is a highly desirable feature in any situation where flammable materials are being handled, because of the convenience of having available a source of substantially inert gas which may readily be circulated through the upper portions of the compartments. It is of particular significance that in the delivery of the oil at the destination, as the engine operates the pump and lowers the level of the oil in any compartment, that compartment may readily have the upper portion concurrently blanketed with the inert gas, and additional quantities of the inert gas as needed to fill the compartment as it is being emptied are, of course, produced concurrently with the delivery action of the pump.

FIG. 4

Figure 4:
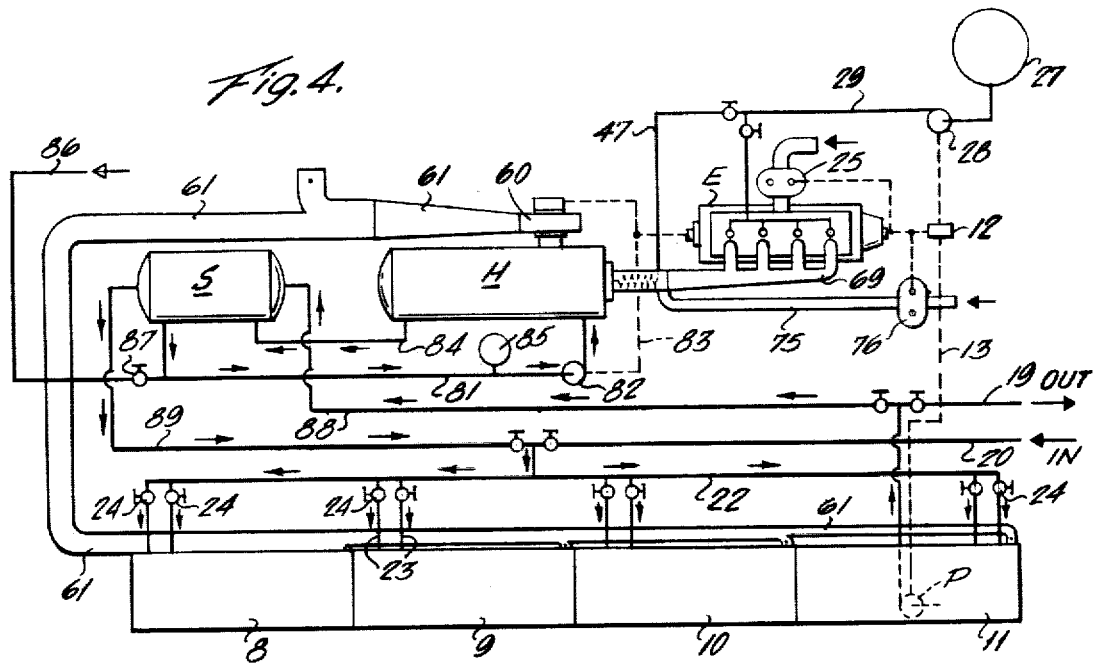
FIG. 4 is a schematic view somewhat similar to FIG. 3 but on a simplified basis and illustrating an alternative embodiment of the system.

Turning now to the embodiment shown in FIG. 4, it is first pointed out that in most respects, the system of FIG. 4 is the same as the system of FIG. 3, but not all of the components have been illustrated in FIG. 4. The principal distinction between the systems of FIGS. 3 and 4 is that whereas in FIG. 3 the oil or other liquid being circulated from the tanks for the purpose of warming the oil is passed directly through the liquid or oil flow passages of the heat exchanger H, in FIG. 4, the heat exchanger H is employed to transfer heat to a heat transfer medium which, in turn, is circulated through a second heat exchanger in which the heat transfer medium is brought into heat exchange relation with the oil from the compartments on the barge.

The second heat exchanger is merely indicated in outline in FIG. 4, being shown at S. The heat exchange liquid is introduced into the exchanger H through the connection 81 by means of the pump 82 which may be driven by the engine E as indicated at 83. This liquid is delivered into the inlet connection which is indicated at 40 in FIG. 6, i.e., the connection through which the oil is introduced into the heat exchanger in the embodiment of FIG. 3. Similarly, the heated heat exchange medium is delivered from the heat exchanger H through the connection 84 which extends to the second exchanger S, and after being brought into heat exchange relation with the oil in the exchanger S, the heat exchange medium is again delivered into the connection 81, thereby completing the circuit. This closed circuit circulation is desirably provided with an expansion chamber indicated at 85. Replenishment of heat exchange medium may be effected through the connection 86 under the control of valve 87.

In the embodiment of FIG. 4, the oil from the tanks is brought to the second heat exchanger S through the line 88, and is returned to the tanks through the line 89, valving being provided in the same manner as in FIG. 3.

The system of FIG. 4 is of particular advantage in situations where the liquid being warmed is relatively flammable, and with which it may be desired to avoid bringing such liquid into close proximity with a combustion chamber, such as the secondary combustion chamber enclosed in the heat exchanger H.

In other respects, the embodiment of FIG. 4 operates and has the advantages pointed out above in connection with FIG. 3.

FIG. 5

Figure 5:
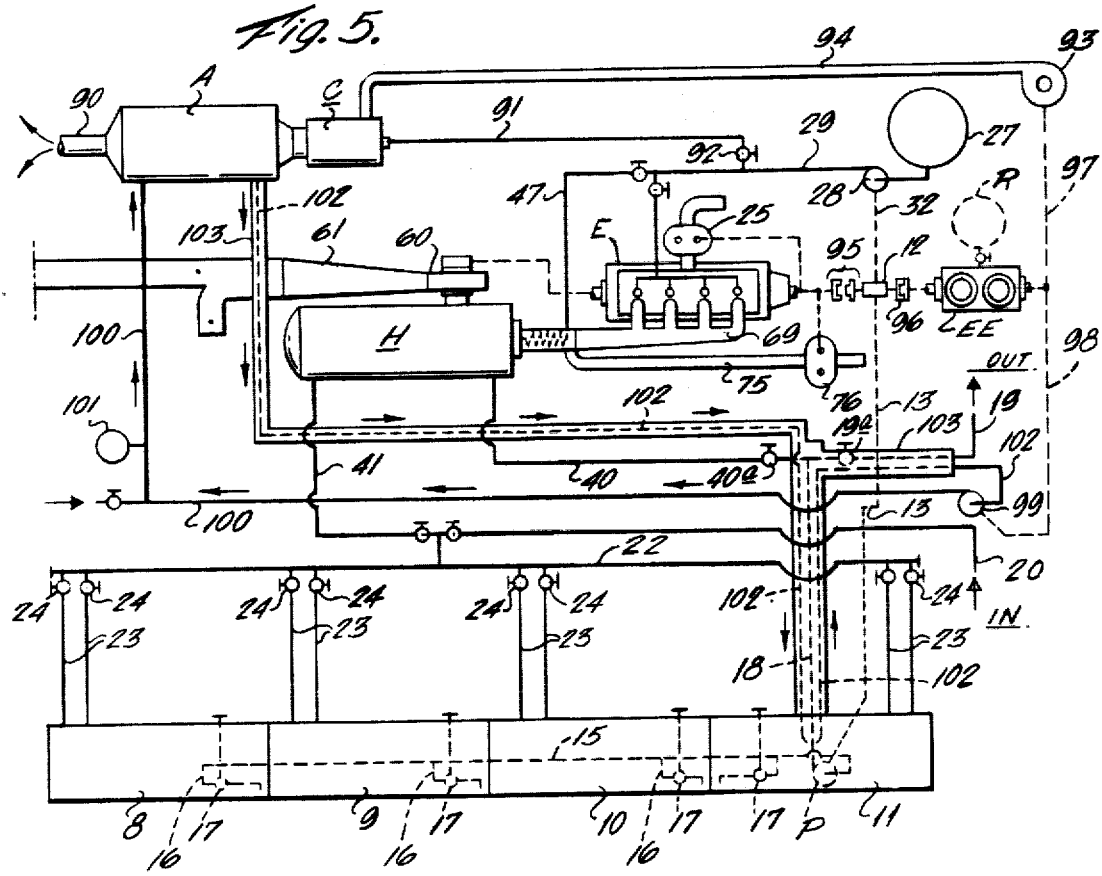
FIG. 5 is a view similar to FIG. 4 but illustrating still another embodiment of the system.

Turning now to the embodiment shown in FIG. 5, it is first pointed out that this embodiment includes the same components as shown in FIG. 3; but in addition, this embodiment illustrates an arrangement according to which an emergency or standby motor and certain associated parts may be added to a system of the kind shown in FIG. 3. This standby system is arranged to provide at least some limited warming of the oil for purposes of delivery or discharge at the destination, even in the event of failure of the main engine or components associated therewith.

The standby system of FIG. 5 includes an auxiliary or standby heat exchange device A. This device has a combustion chamber C associated therewith, and the products of combustion from that chamber are delivered through flue passages in the exchanger A, to be discharged from the stack 90. Fuel may be supplied to the combustion chamber C through the connection 91 under the control of the valve 92, this fuel being derived from the line 29 associated with the supply tank 27 and pump 28. Air for combustion in the chamber C may be provided by the blower 93 delivering through the connection 94.

As in the embodiment of FIG. 3, the pump 28 is adapted to be driven through a transmission 12, but in the embodiment of FIG. 5, a clutch 95 is provided so that the transmission 12 can be connected and disconnected with reference to the engine E. The emergency or standby engine which is indicated at EE is provided with a controllable clutch 96 for driving the transmission 12 and thus also the fuel pump 28. Still further, as will be seen from FIG. 5, the clutches 95 and 96 will also provide for alternative operation of the main pump P through the transmission 12 and the power connection 13.

The emergency engine may be supplied with fuel from a reserve tank R.

The engine EE has a power connection 97 with the blower 93 and also has a power connection 98 extended to a circulating pump 99, the purpose of which is described hereinafter.

Referring again to the auxiliary heat exchanger A, it is now pointed out that this exchanger is provided with liquid flow passages in heat exchange relation to the flue passages above referred to, and a heat exchange medium is circulated in a closed circuit through the liquid flow passages. This liquid is delivered to and through the auxiliary exchanger A by means of the pump 99 and the connections 100. This system having an expansion chamber indicated at 101. At the outlet side of the exchanger A, the heat exchange medium is delivered through the line 102 which extends within a heat insulating shield 103. The line 102 is arranged in a closed circuit including a portion extended down to a region close to the pump P in the bottom of the compartment in which the pump is located, the line 102 then returning back up to a position adjacent to the output line 19. The insulating shield or sleeve 103 is extended to encompass both the vertical oil outlet line 18 as well as the associated downward loop of the line 102 for the heat transfer medium; and still further, this heat insulation 103 is extended in association with the delivery line 19 and the associated portion of the circulation connections 102 for the heat exchange medium. As seen toward the right in FIG. 5, the connection 102 delivers the heat transfer medium to the pump 99, for recirculation in the system.

The standby system described above in connection with FIG. 5 is adapted for emergency use in the event of failure in the principal engine E or some part of the system associated with that engine. The engine EE and the associated components may also be used as an alternative to the engine E, even in situations where the engine E has not failed, but where the fuel oil heating capacity of the engine E and its associated components may not be required in order to effect the desired delivery of the oil at the destination.

In connection with the system of FIG. 5, it should be kept in mind that with a drop in ambient temperature, a substantial amount of time is required for the chilling of the oil in the compartments of the barge to a level resulting in such increase in viscosity that pumping is difficult or impossible. However, in some circumstances, the temperature drop may be such as to increase the viscosity of the oil in the delivery line itself to such an extent as to make it difficult to unload the oil at the destination. The system of FIG. 5 may be employed in such circumstances (even in the event of failure in the engine E) in order to provide some oil warming capacity. It will be understood that when employing the standby system shown in FIG. 5, the valve 40a in the connection 40 to the heat exchanger H would be closed, and the valve 19a opened for oil discharge.

FIG. 8 [I]

As above indicated, the system schematically illustrated in FIG. 8 bears certain resemblance to the system shown in FIG. 4 and described above. Thus, in FIG. 8, as in FIG. 4, the oil being circulated from the tanks or compartments on the barge through the heat exchange equipment is passed through the heat exchange device indicated at ST which is indirectly heated from the heat developed in the heat exchange H which, in turn, receives the products of combustion from the prime mover E. In this respect, the systems of FIGS. 8 and 4 differ from the systems of FIGS. 3 and 5. In both of FIGS. 3 and 5, provision is made for heating of the oil or other viscous liquid by circulating the oil through the heat exchanger H in which the products of combustion are received from the prime mover.

In the embodiment of FIG. 4, the heat exchanger S is indirectly heated by means of a heat transfer medium which is circulated through the exchanger H, as well as the exchanger S, the circulation lines 81 and 84 being provided for that purpose. In FIG. 4, it is contemplated that a heat transfer medium be employed which is suitable for continuous circulation between the units H and S. The system of FIG. 8 is similar to that of FIG. 4 but is particularly adapted to the use of water as the indirect heat transfer medium. More specifically, it is contemplated in FIG. 8 that the water be elevated in temperature and pressure in the exchanger H and that saturated steam be developed from this heated water, the steam being passed through one side of the heat exchanger ST, the oil being passed through the other side in indirect heat exchange relation, and a special form of heat exchanger suitable for this purpose is illustrated in FIGS. 10 and 11, described more fully hereinafter. In addition, the system of FIG. 8 also contemplates the feed of the steam into and through the tracers provided in association with certain of the oil flow lines, as will also be described hereinafter with particular reference to FIGS. 8 and 9.

In considering the specific connections and arrangements of the system of FIG. 8, it is first noted that the connection 88 may receive the circulating oil to be warmed through the valve 40a from the pump P. After flowing through the passage means comprising one side of the heat exchanger ST, the warmed oil is delivered through the connection 89, from which it may be delivered through the valve 42 and through other connections and valves into any one of the compartments or tanks 8-8, 9-9, 10-10, 11-11. As in other embodiments, the pump P may also serve to deliver the oil at the destination of the barge, through the valve 19a and the outlet line 19. Incoming oil being received by the barge will be supplied through the line 20 and through the valve 21 to various other connections and valves providing for distribution of the incoming oil to the various compartments or tanks of the barge.

The other side of the heat exchanger ST is associated with a closed circulation system associated with the passage means in the heat exchanger H to which the heat is being transferred in the manner already described above with reference to several of the embodiments already considered. However, in FIG. 8, the indirect heat transfer system between the exchangers H and ST is different and contemplates the use of water. Thus, the circulation system includes the line 104 and the pump 82 which deliver the water into the exchanger H and also deliver the heated water from the exchanger H through the connection 105, which is extended to the vaporizer V of known type having an associated control system 106 providing for maintenance of an appropriate water level in the vaporizer tank, so that saturated steam is released from the water for delivery through the steam line 107. The return line 108 extends from the lower part of the vaporizer V and connects with the water supply line 104, this arrangement being of known type to provide for maintenance of the desired level of superheated water in the vaporizer.

The steam supply line 107 has two branches indicated at 109 and 110. The line 109 extends to the heat transfer passage means in the heat exchanger ST which are in heat exchange relation to the passage means providing for the circulation and heating of the oil. The return line 111 of the steam side of the exchanger ST may be provided with a steam trap diagrammatically indicated at 111a, and should be provided with a condensate reservoir (with float control) of known type indicated at 112, from which the condensate is delivered through line 113 having a pump 114 which returns the condensate to the line 104, and thus completes the closed circuit.

Although the arrangement as just described is adapted to make efficient use of the saturated steam in the exchanger ST for warming the oil carried by the barge, this system has the further advantage that it may concurrently be used to supply steam to tracers associated with exposed and insulated flow lines, as is also illustrated in FIG. 8, and described hereinafter, following description of FIG. 9.

FIG. 9

Before explaining the tracer steam supply, reference is first made to a typical tracer arrangement as shown in FIG. 9. Here, an oil flow line is indicated at 115, this line being enclosed in insulating jacket 116 lying within an aluminum wrap or other shell 117. Toward the bottom of FIG. 9, two tracer pipes indicated at 118 and 119 are indicated as being extended lengthwise of the flow line within the insulating jacket. The pipe 118 may serve as the steam inlet line and the pipe 119 as the outlet. As above mentioned, the pipes 118 and 119 are desirably arranged as a loop being interconnected at one end, so that the steam will flow into pipe 118 and thence into pipe 119, with the free end of pipe 119 connected to return condensate to the system. Desirably, the heat exchange relation between these pipes 118 and 119 is such that even upon the introduction of steam into the pipe 119, the heat transfer effected to the oil in the flow line 115 will bring the temperature down to the condensate range, so that condensate will be delivered from the pipe 119.

An alternative location for a tracer input line appears in dotted lines in the center of FIG. 9 at 118a.

FIG. 8 [II]

Attention is now directed to the fact that the exposed flow lines shown in FIG. 8, including 19, 20, 22, 88 and 89, all have tracers associated therewith. Thus, steam input tracer pipes 118 and condensate outlet pipes 119 are associated with all of these exposed flow lines, all of the tracer input lines 118 being supplied from the branch 110 of the main steam supply line 107, and all of the return lines 119 being associated with the principal condensate return line 120 which extends to the line 113 in which the condensate joins the condensate from the steam trap 112 and is delivered by the pump 114 back to the input side of the heat exchanger H through the connection 104 and the pump 82. Preferably, a steam trap diagrammatically indicated at 120a is located in the return line 120.

It will be understood that tracers may be present in association with the various flow lines as shown in various other figures of the drawings, including FIGS. 1 and 2, which illustrate the general overall arrangement of the barge.

The two branches 109 and 110 of the main steam line 107 are each provided with a shut-off valve 121 and also with an adjustable pressure control device 122; and in view of this, the heat exchanger ST and the tracer system may be operated either independently of each other or concurrently and may also be adjusted with respect to the relative pressures and temperatures employed in each.

Replenishing water may be fed into the system through the supply line 123 under the control of the valve 124.

FIGS. 10 and 11

As above noted, when employing steam, it is desirable to employ a heat exchanger for heating the oil, which heat exchanger is particularly adapted for efficient operation with such steam. A heat exchanger which is well adapted for this purpose is shown in FIGS. 10 and 11. This exchanger has a shell 125 provided with an insulating jacket 126, enclosing an annular group of tube-in-tube units similar to those described above in connection with FIGS. 6 and 7, the inner and outer tubes being provided with tube sheets also similar to those referred to above. However, as will be seen from FIGS. 10 and 11, the connections are differently made, the steam input line 109 being connected with the central tube 127 extended substantially throughout the length of the exchanger and delivering the steam into the header space 128 from which the steam flows through the outer tubes of the tube-in-tube units to the other end of the exchanger at which the outer tubes deliver into a header space having the discharge connection 111 described above in connection with FIG. 8.

The oil being circulated enters through the input line 88 into the space inside of the shell at the adjacent end of the exchanger, from which the oil flows through the inner tubes of the tube-in-tube units and also flows around the entire annular group of tube-in-tube units, to the opposite end of the exchanger, which serves as a header space with which the outlet connection 89 communicates.

With the use of the tube-in-tube units in an exchanger of the kind just described, highly efficient use may be made of the steam in effecting heat transfer to the oil to be warmed. The extensive surface area provided by the tube-in-tube units and also the provision for counterflow of the oil and steam result in heat transfer to an extent which makes use of the latent heat of condensation, the condensate being delivered from the heat exchanger and returned to the circulation system as above described.

CONCLUSION

From the foregoing, it will be seen that the present invention contemplates an exceptionally effective utilization of available BTU's in the warming of oil or other viscous liquids carried on barges. The systems of the present invention are particularly suited to the utilization of heat generated by a prime mover employed on the barge for pumping the oil and/or for other purposes, employing heat exchanger mechanism including first passage means for the cargo liquid and other passage means having indirect heat exchange relation to the cargo liquid in the first passage means. The indirect heat exchange relation referred to is accomplished either in passage means provided in a single heat exchanger (as in the systems of FIGS. 3 and 5) or in a pair of interconnected heat exchangers (as in the systems of FIGS. 4 and 8), the heat being transferred by the use of a heat transfer medium from one of the exchangers to the other.

In addition to the foregoing, it will be noted that the present invention not only contemplates the warming of the oil by circulating it through a heat exchanger, but also contemplates utilizing available steam employed in the heat exchanger in a manner which will also serve to supply tracers, such as those commonly employed in connection with exposed flow lines for the oil or other viscous liquids on barges.

I claim:

1. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, a cargo liquid pump driven by said prime mover, and connections between the pump and said first passage means in the heat exchange mechanism providing for circulation of the liquid from the tanks to and through said first passage means and thence back into the tanks.

2. Equipment as defined in claim 1 and further including ducting for delivering the products of combustion from the secondary combustion chamber into and through the upper portions of the tanks.

3. Equipment as defined in claim 2 and further including a blower for delivering the products of combustion from the secondary combustion chamber through said ducting, the blower being driven by said prime mover.

4. Equipment as defined in claim 1 in which the heat exchange mechanism comprises a tube-in-tube type of heat exchanger in which the cargo liquid and the secondary combustion products are in indirect heat exchange relation.

5. Equipment as defined in claim 4 in which the tube-in-tube elements of the heat exchange mechanism are arranged in an annular tube bundle surrounding the secondary combustion chamber.

6. Equipment as defined in claim 5 in which the secondary combustion chamber is connected with the annular passages between the tube elements of each tube-in-tube unit and in which the mechanism for circulating the cargo liquid is connected with the inner tube of each tube-in-tube unit to effect flow of the liquid to be heated therethrough.

7. Equipment as defined in claim 1 in which the heat exchange mechanism comprises two heat exchangers each having two sets of flow passages in heat exchange relation to each other, means providing a closed circuit circulation of a heat exchange liquid sequentially through one of the two sets of flow passages in each of said two heat exchangers, the other set of flow passages of one of the heat exchangers being connected with the secondary combustion chamber to receive the products of combustion therefrom, and the other set of flow passages of the other heat exchanger being connected with the mechanism providing for circulation of the cargo liquid from the tanks.

8. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, including a fuel supply connection in heat exchange relation to the exhaust gas of the prime mover, and connections providing for circulation of the cargo liquid from the tanks to and through said first passage means and thence back into the tanks.

9. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, an air blower driven by the prime mover, connections for introducing air from said blower into the secondary combustion chamber, and connections providing for circulation of the cargo liquid from the tanks to and through said first passage means and thence back into the tanks.

10. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, a pump driven by said prime mover, a cargo liquid discharge connection for delivering cargo liquid from the vessel, circulation connections for circulating cargo liquid from the tanks to and through said first passage means of the heat exchange mechanism, and means providing for connection of the pump alternatively with said cargo discharge connection and with said circulation connections.

11. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, a supply of fuel for the prime mover and for the secondary combustion chamber, a fuel pump driven by the prime mover and receiving fuel from said supply, fuel delivery connections extended from the fuel pump to both the prime mover and the secondary combustion chamber, and connections providing for circulation of cargo liquid from the tanks to and through said first passage means and thence back into the tanks.

12. Equipment for handling viscous oil on a vessel having one or more oil tanks or compartments, comprising a hydrocarbon burning prime mover of the type in which the exhaust gas contains a substantial amount of free oxygen, heat exchange mechanism including first passage means for the oil carried in said tanks and other passage means having indirect heat exchange relation to the oil in said first passage means, a secondary combustion chamber associated with said other passage means, a conduit for delivering the exhaust gas from said prime mover into the secondary combustion chamber, a blower driven by the prime mover for introducing air into the secondary combustion chamber, means for delivering products of combustion from the secondary combustion chamber through the upper portions of the tanks, and connections providing for circulation of the oil from the tanks to and through the first passage means of the heat exchange mechanism and thence back into the tanks.

13. Equipment as defined in claim 12 and further including a pump driven by the prime mover for effecting the circulation of the oil through the heat exchange mechanism.

14. Equipment as defined in claim 13 and further including a fuel pump driven by the prime mover for delivering fuel into the secondary combustion chamber.

15. A method for handling viscous oil on a vessel having one or more oil carrying tanks or compartments, which method comprises burning fuel in a prime mover of the type in which the exhaust gas contains a substantial amount of oxygen, mixing the exhaust gas from the prime mover with additional fuel, effecting secondary combustion of said mixture and thereby developing secondary combustion products, and effecting heat transfer from said secondary combustion products to the oil carried by the vessel.

16. A method as defined in claim 15 in which said heat transfer is effected in a heat exchanger having two sets of passages in indirect heat exchange relation to each other, the method further including delivering the secondary combustion products through one set of passages in the heat exchanger, and effecting circulation of oil from the tanks through the other set of passages in the heat exchanger and thence back into the tanks.

17. A method as defined in claim 15 and further including circulating said secondary products of combustion through upper portions of oil containing tanks on the vessel.

18. A method as defined in claim 17 in which the quantity of fuel mixed with the exhaust gas from the prime mover is sufficient to combine with the oxygen present and thereby provide for production of substantially oxygen free secondary products of combustion.

19. Equipment for handling a liquid cargo on a vessel having one or more cargo tanks or compartments, comprising a hydrocarbon burning prime mover, heat exchange mechanism including first passage means for the cargo liquid carried in said tanks and other passage means having indirect heat exchange relation to the liquid in said first passage means, connections for delivering products of combustion from said prime mover into said other passage means, a circulating pump driven by the engine, and connections associated with the pump and providing for circulation of the cargo liquid from the tanks to and through the first passage means of the heat exchange mechanism and thence back into the tanks.

20. Equipment as defined in claim 19 in which the heat exchange mechanism comprises two heat exchangers each having first and second flow passages in indirect heat exchange relation to each other, means providing a closed circulation circuit for a heat exchange medium extended sequentially through one of the two sets of flow passages in each of said two heat exchangers, the other set of flow passages of one of the heat exchangers being connected to receive products of combustion from the prime mover, and the other set of flow passages of the other heat exchanger being connected with the circulating pump to receive cargo liquid therefrom.

21. Equipment as defined in claim 20 and further including a pump driven by the engine and connected in said closed circulation circuit to effect circulation of said heat exchange medium.

22. Equipment for handling a liquid cargo on a vessel having one or more cargo tanks or compartments, comprising a hydrocarbon burning prime mover of the type in which the exhaust gas contains a substantial amount of free oxygen, said prime mover having a cooling system including passage means for a cooling liquid, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, a pump driven by said prime mover, connections between the pump and said first passage means in the heat exchange mechanism providing for circulation of the cargo liquid from the tanks to and through said first passage means and thence back into the tanks, and means for effecting heat transfer from the cooling liquid of the cooling system for the prime mover to the cargo liquid being circulated by said pump.

23. Equipment for handling a viscous oil cargo on a vessel having one or more oil tanks or compartments, comprising a hydrocarbon burning prime mover of the type in which the exhaust gas contains a substantial amount of free oxygen, heat exchange mechanism including first passage means for cargo oil carried in said tanks and other passage means having indirect heat exchange relation to the cargo oil in said first passage means, a secondary combustion chamber associated with said other passage means, a conduit for delivering the exhaust gas from said prime mover into the secondary combustion chamber, a blower driven by the prime mover for introducing air into the secondary combustion chamber, means for delivering products of combustion from the secondary combustion chamber through the upper portions of the tanks, connections providing for circulation of the cargo oil from the tanks to and through the first passage means of the heat exchange mechanism and thence back into the tanks, said prime mover having a cooling system including passage means for a cooling liquid, and means for effecting heat transfer from the cooling liquid of the cooling system of the prime mover to the cargo oil being circulated.

24. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, an air blower driven by the prime mover and delivering air into the secondary combustion chamber, a pump driven by said prime mover, and connections between the pump and said first passage means in the heat exchange mechanism providing for circulation of the cargo liquid from the tanks to and through said first passage means and thence back into the tanks.

25. Equipment for handling a liquid cargo on a vessel having one or more cargo tanks or compartments, comprising a hydrocarbon burning prime mover, heat exchange mechanism having heat transfer passage means for transferring heat from the prime mover to the cargo liquid, a pump adapted to be driven by the prime mover and having connections for circulating the cargo liquid from the tanks through said passage means, discharge connections providing alternatively for discharging the cargo liquid pumped from the tanks to a point of delivery externally of the vessel, said discharge connections being provided with heat insulation jacketing, a standby engine for driving the pump, and power transmission connection providing for drive of said pump alternatively by the prime mover and/or by the standby engine.

26. Equipment as defined in claim 25 and further including standby mechanism alternatively operable to transfer heat to the cargo liquid being circulated by the pump from the tanks.

27. Equipment as defined in claim 26 in which the standby liquid heating mechanism comprises a combustion chamber with associated heat transfer passage means for the cargo liquid, and means adapted to be driven by the standby engine for supplying fuel to said combustion chamber.

28. Equipment as defined in claim 27 and further including a blower adapted to be driven by the standby engine and adapted to deliver air to said combustion chamber.

29. Equipment for handling a liquid cargo on a vessel having one or more cargo tanks or compartments, comprising a hydrocarbon burning prime mover of the type in which the exhaust gas contains a substantial amount of free oxygen, heat exchange mechanism including first passage means for the cargo liquid carried in said tanks and other passage means having indirect heat exchange relation to the cargo liquid in said first passage means, a secondary combustion chamber associated with said other passage means, a conduit for delivering the exhaust gas from said prime mover into the secondary combustion chamber, means for introducing fuel into the secondary combustion chamber, the prime mover having a cooling system including passage means for a cooling liquid, connections providing for circulation of the cargo liquid from the tanks to and through said first passage means of said heat exchange mechanism and thence back into the tanks, and means for circulating the cooling liquid of the cooling system for the prime mover in indirect heat exchange relation to the cargo liquid being circulated.

30. Equipment as defined in claim 29 and further including means for preheating the fuel introduced into the secondary combustion chamber comprising means for effecting heat transfer from the exhaust gases of the prime mover to the fuel being introduced into the combustion chamber.

31. A method for handling viscous oil on a vessel having one or more oil carrying tanks or compartments, which method comprises burning fuel in a prime mover of the type in which the exhaust gas contains a substantial amount of free oxygen, mixing the exhaust gas from the prime mover with additional fuel, effecting secondary combustion of said mixture and thereby developing substantially inert secondary combustion products, effecting heat transfer from said inert secondary combustion products to the oil in the tanks, delivering oil from the tanks by a pump driven by said engine, and after effecting heat transfer therefrom delivering said inert secondary combustion products to the upper portions of the tanks as the oil is pumped therefrom.

32. Equipment for handling a liquid cargo on a vessel having one or more cargo tanks or compartments, comprising a cargo liquid discharge line, a pump for delivering cargo liquid from the tanks through the discharge line, an insulation jacket for said discharge line, means for burning fuel and thereby produce hot combustion products, a heat exchanger having first and second flow passages in indirect heat exchange relation to each other, means for delivering the hot combustion products through the first flow passage of the heat exchanger, and means for circulating a heat exchange medium in a closed circuit through the second flow passage and thereby effect transfer of heat from the combustion products to the heat transfer medium, the means for circulating the heat exchange medium including a conduit extended within the insulation jacket in proximity to the liquid discharge line.

33. Equipment as defined in claim 32 in which said means for burning fuel comprises a prime mover, the delivery pump being connected with and driven by said prime mover.

34. Equipment for handling a cargo of a viscous oil on a vessel having one or more oil tanks or compartments, comprising a hydrocarbon burning prime mover, heat exchange mechanism including first and second heat exchange devices, each having first and second heat exchange passage means in indirect heat exchange relation to each other, the first passage means of the first device being connected to receive products of combustion from the prime mover, the second passage means of the second device being connected with cargo tanks for circulation of the viscous oil, and the second passage means of the first heat exchange device and the first passage means of the second heat exchange device being interconnected by a circulation system containing a heat transfer medium for transferring heat from the first device to the second device and thereby heat the oil being circulated through the second passage means of the second device.

35. Equipment for handling a cargo of a viscous oil on a vessel having one or more oil tanks or compartments, comprising a hydrocarbon burning prime mover of the type in which the exhaust gas contains a substantial amount of free oxygen, heat exchange mechanism including first and second heat exchange devices, each having first and second heat exchange passage means in indirect heat exchange relation to each other, the first passage means of the first device being connected to receive products of combustion from the prime mover, the second passage means of the second device being connected with cargo tanks for circulation of the viscous oil, and the second passage means of the first heat exchange device and the first passage means of the second heat exchange device being interconnected by a circulation system containing a heat transfer medium for transferring heat from the first device to the second device and thereby heat the oil being circulated through the second passage means of the second device, the circulation system comprising a water circulation system containing a vaporizer, and the first passage means of the first heat exchange device including a combustion chamber with fuel supply means providing for combustion of fuel and the free oxygen contained in the products of combustion received from the prime mover and adapted to raise the water of the circulation system to a temperature above the boiling point and to a pressure above atmospheric as the water is delivered to the vaporizer, the vaporizer providing for delivery of steam to the first passage means of the second heat exchange device.

36. Equipment as defined in claim 35 and further including oil-handling piping associated with the tanks and comprising piping with insulating jacket means, tracers associated with insulated piping, and connections for delivering steam for said vaporizer into the tracers.

37. Equipment as defined in claim 36 and further including a condensate return line connected with the tracers and with the second passage means of the first heat exhange device to return the condensate to said first device.

38. Equipment as defined in claim 35 in which the first and second passage means of the second heat exchange device comprise pairs of tube-in-tube heat exchange tubes providing for decrease of the temperature of the steam below the dew point, and means for returning resultant condensate to the second heat exchange passage means of the first heat exchange device.

39. Equipment as defined in claim 38 and further including oil-handling piping associated with the tanks and comprising piping with insulating jacket means, tracers associated with insulated piping, and connections for delivering steam from said vaporizer into the tracers, and further including a condensate return line connected with the tracers and with the second passage means of the first heat exchange device to return the condensate to said first device.

* * * * *